May 20, 1958    R. E. STECK    2,835,367
FRICTION BUTTON AND SECURING MEANS THEREFOR
Filed April 25, 1955
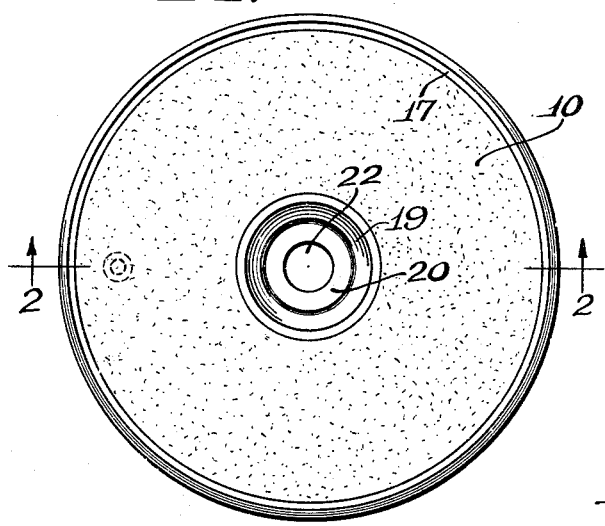
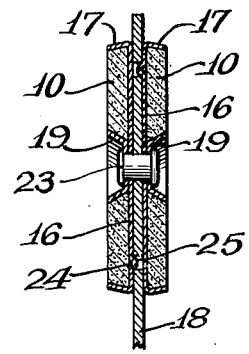
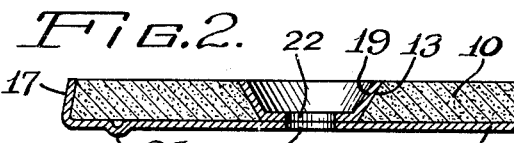
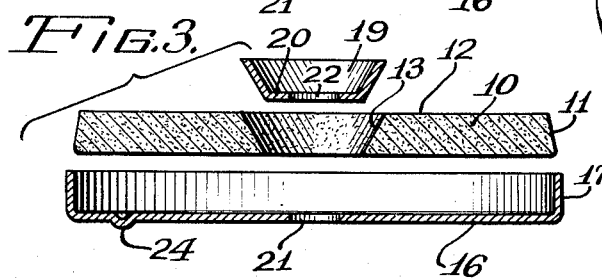
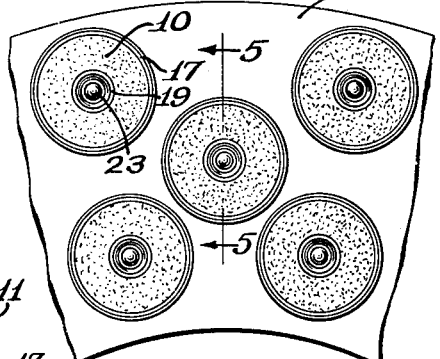
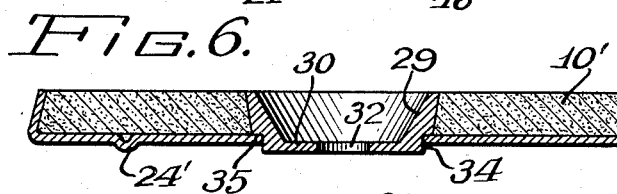
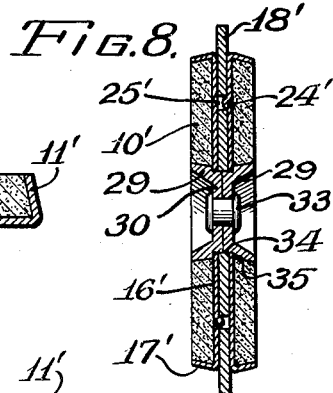
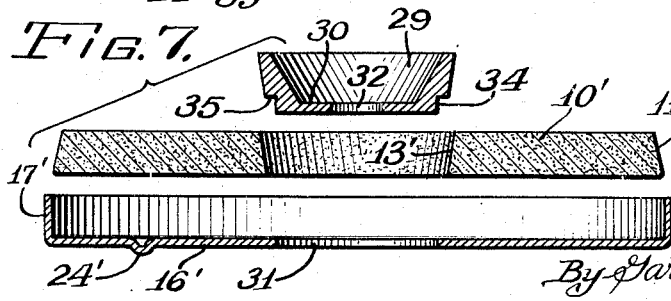
Inventor:
Rudolph E. Steck
By Mary, Desmond & Parker
Attys.

2,835,367

FRICTION BUTTON AND SECURING MEANS THEREFOR

Rudolph Edward Steck, Stratford, Conn., assignor to Raybestos-Manhattan, Inc., Passaic, N. J., a corporation of New Jersey Application April 25, 1955, Serial No. 503,404

5 Claims. (Cl. 192—107)

This invention relates to friction assemblies wherein a friction material composition is supported by one component of a frictional apparatus in the operation of which slippage occurs between it and a metallic mating component, such as brakes and clutches for automotive and industrial equipment.

More specifically, the present invention is directed to novel means for supporting and engaging a plurality of preformed friction composition elements in coplanar, peripherally spaced relationship to each other on a supporting member, for cooperative relationship with a metallic mating member having a surface area relatively greater than the total surface areas of the composition friction elements.

It is a particular object of the present invention to provide novel means for supporting preformed friction material composition discs or buttons, especially those of brittle or fracturable composition, and for securely and conveniently engaging them to a supporting element of the friction assembly.

The present invention is particularly adapted for use with friction material compositions adapted to withstand high degrees of frictionally generated heat encountered in the braking of high speed or heavy duty vehicles and industrial equipment. Examples of such compositions in general are fired ceramic compositions comprised of porous matrices composed of refractory metallic oxides such as alumina or zirconia with or without added fillers such as metallic inclusions and heat hardenable organic saturants; sintered powdered metal matrix compositions containing inclusions of nonmetallic friction modifying fillers of varying sizes; and high pressure compacted porous bodies comprised of, for example, a major amount of powdered metal such as copper together with a relatively minor amount of a powdered coarse-grained mineral substance, such as mullite.

Compositions of the foregoing class, particularly in the manner employed, are subject to fracture in use, and in order to prevent this are desirably provided with supports which not only seat but additionally peripherally embrace the friction composition elements. The present invention provides novel metallic cup means securely receiving and retaining preformed annular discs of friction material compositions of the class described and for securely engaging the assemblies to a supporting element.

Other objects and advantages of the present invention and details of construction and arrangement of parts will be apparent from a consideration of the following specification and accompanying drawing, wherein:

Fig. 1 is a plan view of a friction composition element supported in accordance with the present invention.

Fig. 2 is a section on the line 2—2 of Fig. 1, illustrating one form of the present invention.

Fig. 3 is an exploded view of the components of the assembly of Fig. 2.

Fig. 4 is a section of a clutch plate having secured thereto a plurality of friction element assemblies of Fig. 2.

Fig. 5 is a fragmentary section on the line 5—5 of Fig. 4 illustrating a pair of friction element assemblies secured back-to-back on the opposed faces of the clutch plate.

Fig. 6 is a section similar to that of Fig. 2, illustrating a modified form of supporting structure.

Fig. 7 is an exploded view of the components of the assembly of Fig. 6.

Fig. 8 is a section similar to that of Fig. 5 embodying the assemblies of Fig. 6.

Referring to the drawing, and particularly to Figs. 1 to 5, the reference numeral 10 generally designates a preformed friction composition element of the class described in the form of a flat, parallel faced disc or button of frusto-conical contour; that is to say, its outer periphery 11 is tapered inwardly from the large base to the operating face 12 about 10°, and formed with an aperture 13 of oppositely inclined frusto-conical contour.

In the initial assembly the friction element 10 is placed within the metallic cup generally designated as 16, the side wall 17 being initially cylindrical and having a diameter substantially equal to that of the base or largest diameter of element 10 so that it can freely receive it. After the element 10 is placed within the cup 16, the cup side wall 17 is crimped inwardly, by means of a suitable tool, so that it is in contiguous embracing and supporting relationship with the inclined periphery 11, and the two components 10 and 16 thereby securely interlocked, as shown in Fig. 2.

For the purpose of further protectively supporting the inner periphery at aperture 13 of the element 10, and for securely engaging the assembly to an operative support, such as the metal plate 18, I provide a frusto-conical cup 19 having a side wall incline mating the contour of aperture 13, the base 20 of cup 19 being of greater diameter than that of the axial aperture 21 in cup 16 so that the base of cup 19 seats on the base of cup 16, the axial aperture 22 in cup 19 coinciding with aperture 21 in cup 16. Thus after inserting the conical cup 19 in the aperture 13 of the friction button 10, the resulting assembly may be secured to the supporting plate 18 by means of a rivet 23 inserted through the aligned apertures 22 and 21 and through a corresponding aperture in the plate 18, the illustration of Fig. 5 showing an arrangement where a pair of friction composition element assemblies are secured back-to-back on the opposed surfaces of plate 18 by means of the common rivet 23, for use as a clutch plate.

In order to prevent spin or rotation of the button assemblies mounted on plate 18 and possible tendency to saw off the rivet shanks in use, the cups 16 are each provided with a protrusion 24 receivable in an aperture 25 in plate 18. In the illustration of Fig. 5 a pair of such apertures spaced 180° apart are provided for receiving the respective protrusions 24 of a back-to-back pair of assemblies.

The modified arrangement of Figs. 6 to 8 is similar to that of the previously described structure, but is more particularly adapted for certain heavy duty applications where it is desired to have the shear stresses completely off the engaging rivets.

Thus a similar preformed friction composition element 10' of frusto-conical contour having an aperture 13' of inverted frusto-conical contour is disposed within the cylindrical metal cup 16' and the side wall 17' crimped into embracing engagement with the tapered outer periphery 11' of the friction element to interlock the two components. In this arrangement, a modified form of conical rivet cup 29 adapted to nest within, interlock with, and protect the inner conical periphery at aperture 13' is employed, this cup 29 having an axial aperture 32 in its base 30 for reception of a rivet 33. Further, in this arrangement, the aperture 31 in the base of cup 16' is of a diameter such that it receives therethrough the outer cylindrical base portion 34 of cup 29, the cup 29 otherwise remaining seated by means of its annular shoulder 35 on the base of cup 16'.

This modified form of assembly is specifically adapted for engaging a pair of supported friction elements in back-to-back engagement, as shown in Fig. 8. Thus the metal plate 18' is provided with an aperture of a diameter adequate to receive the cylindrical portions 34 of rivet cup 29, the extent of protrusion of these cylindrical portions being approximately one-half the thickness of plate 18' permitting the bases of the rivet cups 29 to be brought into substantially contiguous relationship and the remaining portions of a pair of assemblies to be secured against the opposed faces of plate 18' by means of a common rivet 33 received through the apertures 32 of a pair of back-to-back cups. In this arrangement protrusions 24' from the base of the holder cups 16' receivable in apertures 25' of plate 18' to prevent spin are likewise desirably employed. In this form, however, shear stresses on the rivets 33 are substantially avoided.

It will thus be apparent that the devices of the present invention provide a novel arrangement whereby a friction composition element of brittle character may be supported on its external periphery and additionally supported interiorly to prevent erosion and structural failure during use, the arrangement further providing novel means for engaging friction element pre-assemblies to an operative component of a friction apparatus.

I claim:

1. A friction assembly comprising a flat-bottomed metallic holder cup having an inwardly inclined conical side wall, a complementary frusto-conical friction material composition element disposed therein and peripherally contiguously embraced in interlocking reinforcing engagement thereby, said friction element being formed with an inverted frusto-conical axial aperture, and a flat-bottomed metallic conical rivet cup complementary to and disposed within said conical aperture and in abutting engagement with the bottom of the holder cup, the bottoms of said cups being formed with concentric axial apertures.

2. A friction assembly comprising a flat-bottom metallic holder cup having an inwardly inclined conical side wall, a complementary frusto-conical friction material composition element disposed therein and peripherally contiguously embraced in interlocking reinforcing engagement thereby, said friction element being formed with an inverted frusto-conical axial aperture, and a flat-bottomed metallic conical rivet cup complementary to and disposed within said conical aperture including an annular external shoulder in abutting engagement with the bottom of the holder cup and a terminal cylindrical portion projecting outwardly of and through an axial aperture formed in the bottom of the holder cup, said rivet cup being formed with an axial aperture for reception of a rivet.

3. A friction assembly comprising a flat-bottomed metallic holder cup having an inwardly inclined conical side wall, a complementary frusto-conical brittle friction material composition element wholly disposed therein and peripherally contiguously embraced in interlocking reinforcing engagement thereby, said friction element being formed with an inverted frusto-conical axial aperture, a flat-bottomed metallic conical rivet cup complementary to and disposed within said conical aperture and in abutting engagement with the bottom of the holder cup, the bottoms of said cups being formed with concentric axial apertures, a metal backing plate, and rivet means extending through said apertures and through an aperture formed in said plate unitarily securing the assembly.

4. A friction assembly comprising a metal backing plate, a back-to-back pair of flat-bottomed metallic holder cups on the opposed faces of said plate, each holder cup including an inwardly inclined conical side wall, a complementary frusto-conical preformed brittle friction material composition element disposed therein and peripherally contiguously embraced in interlocking reinforcing engagement thereby, said friction element being formed with an inverted frusto-conical axial aperture, a flat-bottomed metallic conical rivet cup complementary to and disposed within said conical aperture including an annular external shoulder in abutting engagement with the bottom of the holder cup and a terminal cylindrical portion projecting outwardly of and through an axial aperture formed in the bottom of said holder cup for a distance substantially equal to one-half the thickness of the backing plate, said rivet cup being formed with an axial aperture for reception of a rivet, and said backing plate being formed with an aperture for reception of the rivet cup cylindrical projections, and rivet means extending through said apertures anchored at their opposed ends in said rivet cups unitarily securing the assembly with the ends of the opposed pair of rivet cup projections in substantial abutment between the holder plate thickness.

5. A friction clutch assembly comprising a metal backing plate, a plurality of regularly spaced back-to-back pairs of flat-bottom metallic holder cups on the opposed faces of said plate, each holder cup including an inwardly inclined conical side wall, a complementary frusto-conical preformed brittle friction material composition element disposed therein and peripherally contiguously embraced in interlocking reinforcing engagement thereby, said friction element being formed with an inverted frusto-conical axial aperture, a flat-bottomed metallic conical rivet cup complementary to and disposed within said conical aperture and in abutting engagement with the bottom of the holder cup, the bottoms of said cups being formed with concentric axial apertures, and rivet means extending through said apertures and through complementary apertures formed in said plate anchored at their opposed ends in the opposed rivet cups unitarily securing the assembly, the bottoms of said holder cups being formed with means engageable with means formed in said plate for preventing rotation of the holder cups.

References Cited in the file of this patent

UNITED STATES PATENTS

| 131,452 | Massey | Sept. 17, 1872 |
| 556,699 | Scott | Mar. 17, 1896 |
| 2,141,164 | Brehm | Dec. 27, 1938 |
| 2,176,846 | Werme | Oct. 17, 1939 |
| 2,264,192 | Wellman | Nov. 25, 1941 |
| 2,687,275 | Huff | Aug. 24, 1954 |
| 2,767,817 | Davis | Oct. 23, 1956 |
| 2,784,105 | Stedman et al. | Mar. 5, 1957 |
| 2,806,570 | Markus | Sept. 17, 1957 |

FOREIGN PATENTS

| 273,861 | Italy | May 5, 1930 |
| 556,908 | Great Britain | Oct. 27, 1943 |

OTHER REFERENCES

Cerametallic (catalogue of Bendix Aviation Corp.), copyright 1953, form #12—209. (Copy in Div. 24.)